United States Patent Office 2,839,379
Patented June 17, 1958

2,839,379
METAL AGGREGATE

Hendrik de W. Erasmus, Lewiston, N. Y., assignor to Union Carbide Corporation, a corporation of New York No Drawing. Application August 19, 1955
Serial No. 529,576

5 Claims. (Cl. 75—.5)

The invention relates to a novel metal aggregate and, more particularly, to a metal aggregate or pellet comprising ninety percent or more chromium metal. The aggregate of the invention is the product of a novel process described below and the subject of United States patent application Serial No. 529,577, filed August 19, 1955. The process in question involves the solid phase reduction of chromium oxides by carbon.

Much prior work has been done on the reduction of chromium oxides by carbonaceous materials such as chromium carbides and pure carbon. Extensive investigations on this subject have been conducted by the United States Bureau of Mines.

The principal reversible reaction occurring in the production of low-carbon chromium metal from chromic oxide by carbon reduction is $$Cr_2O_3 + 3Cr_4C \rightleftharpoons 14Cr + 3CO$$

To those skilled in the art, it is well known that decreasing the partial pressure of the carbon monoxide causes the reaction to proceed toward the right. According to the Bureau of Mines, Technical Paper 662, page 36, the calculated equilibrium carbon monoxide partial pressure of this reaction is $2.87 \times 10^{-2}$ atmosphere 1407° C.; but this equilibrium partial pressure decreases as the concentration and accompanying activity of the carbide and oxide in the reacting mixture decrease. Also, according to the Bureau of Mines Bulletin 383, the calculated vapor pressure of chromium is $10^{-4}$ atmosphere at 1410° C., and $10^{-3}$ atmosphere at 1594° C. Thus, the temperature and absolute pressure at which complete decarburization can take place approach those at which chromium metal begins to evaporate or at which the reacting mixture melts, particularly since the inside of a briquet reacts more slowly than its surface layers and those briquets which are closest to the source of heat become hotter. When the reacting mixture melts, the liquid boils and splashes due to the evolution of gas unless the carbon and oxygen concentrations have reached sufficiently low values to effect the maintenance of reasonably quiescent molten metal under vacuum. However, if the reaction is carried out in the solid state the time for its completion is greatly extended as the carbon and oxygen contents of the reactants must diffuse toward each other from separate solid particles. Given enough time and adequate contact, this can happen, but the cost is prohibitive and the process tedious. Accordingly, solid phase reactions between chromic oxide and carbon have not achieved industrial acceptance in competition with processes of chromium production such as electrolysis of dissolved chromium compounds, or the reduction of chromic oxide by aluminum, silicon or chromium silicide.

The process by which the metal aggregate of the invention is produced is based upon the discovery that the total heating time required for the complete reduction of chromic oxide by carbon in the solid state may be greatly shortened by preliminarily heating pellets composed of a stoichiometrical mixture of comminuted reacting materials, in vacuo or even at atmospheric pressure, until there is a marked decrease in the rate of gas evolution, and thereafter cooling, regrinding, pelleting and reheating in vacuo the reacting materials to obtain complete reduction of the chromic oxide. The pellets or metal aggregate produced are dense, strong and porous and highly desirable as addition agents in the manufacture of alloy steels.

In the solid phase production of the chromium metal aggregate of the invention, chromic oxide and the selected carbonaceous material are first comminuted and thoroughly blended as by ball milling. The amount of carbonaceous material should be such that the carbon therein is approximately the quantity required stoichiometrically to effect reduction of the chromic oxide.

After mixing, the charge is preferably pelleted or otherwise converted into compressed lump form. Pelleting of the charge provides excellent contact between reacting particles and also the necessary interstitial space for the escape of reaction gases as well as a convenient form for handling the material. Bonding agents such as chromic acid and water, or molasses may be advantageously employed in the formation of pellets. The pellets may then be charged into any suitable vacuum furnace and heated, preferably but not necessarily, in vacuo or under reduced pressure at a temperature at which the reaction proceeds but below the melting point of the pellets until there is a marked decrease in the volume of evolved gas from the reacting materials. At this point the pellets may be cooled to about 200° C. or below and discharged from the furnace. This primary heating procedure ordinarily will remove 80% or more of the combined oxygen in the oxide constituent of the pellets and leave the pellets in a condition suitable for remilling, reblending and repelleting prior to the second stage heating operation.

At the end of the first stage heating and after a preliminary remilling, it may be desirable to adjust the composition to obtain a stoichiometrical balance between the carbon and oxygen in the mixture. This operation should be followed by careful blending as the simple localized addition of carbon or oxide to effect the desired balance will not work satisfactorily. Such an addition, without careful blending, has the effect of adding one reagent as localized particles of high concentration to a much larger mass in which the other reagent occurs in low concentration so that the reagents have to diffuse through the distance of several particle diameters in order to contact each other with a consequent slowing down of the rate of reaction. It is preferable to use as a blending agent other batches of the first stage of reaction in which the departure from the stoichiometric ratio of carbon and oxygen is in the opposite direction.

Following the blending step, the charge is again pelleted and the pellets heated in vacuo or under reduced pressure at a temperature at which the reaction proceeds but below the melting point of the pellets to effect the final reduction of the chromic oxide to chromium metal.

Both the primary heating procedure and the final heating should be at temperatures above 1100° C. and below the melting point of the constituents of the pellets. A maximum temperature of 1600° C. has been found to be satisfactory. Preferably the pellets are heated to a temperature of between 1250° C. and 1400° C. The heating, as indicated above, continues until the rate of evolution of carbon monoxide gas decreases markedly.

The pellets of chromium metal of the invention are in the form of highly compacted, uniformly porous, strongly cohesive, non-friable sintered aggregates and are preferably of a size not exceeding about two inches in any dimension. The pellets have an apparent density about 5 to 5.5 grams per cubic centimeter as compared with a density of 6.92 grams per cubic centimeter for solid chromium metal.

Nickel, cobalt and other non-volatile metals may be introduced into the final product by incorporating these metals or their oxides or carbides into the original mixture in such amounts as to maintain a stoichiometrical relationship between carbon and oxygen in the total mixture to be treated.

The pellets of the invention are particularly suitable for use in the production of chromium-containing ferrous and non-ferrous alloys and chromium steels. The introduction of a given amount of chromium into a molten bath of metal may be accomplished more rapidly with the pellets of the invention than with a corresponding amount of similarly sized pieces of solid chromium metal. The shorter production time obtained from their use enables a savings in manhours and a corresponding increase in plant production for given furnace facilities. In addition, there is less loss of chromium due to oxidation at the high temperatures employed in the alloying processes.

The following specific example will serve to illustrate the manner in which the two-stage, solid phase method is applied to the production of sintered chromium metal pellets from chromic oxide by carbon reduction.

The chromic oxide employed had the following analysis:

| | Percent |
|---|---|
| Cr$_2$O$_3$ | 98.34 |
| Fe$_2$O$_3$ | 0.07 |
| C | 0.05 |
| S | 0.11 |
| SiO$_2$ | 0.06 |

The carbon black employed had the following analysis:

| | Percent |
|---|---|
| Fixed C | 98.62 |
| Volatile matter | 1.38 |
| Ash | Nil |

A stoichiometric mixture of chromic oxide and carbon black was prepared and ground together in a ball mill for about 15 minutes; 4% chromic acid, by weight in the form of a water solution was then added as a binder and the material was then mechanically mixed for about one hour. Pellets were prepared from the moist mixture in a high pressure pelleting press and the pellets so made were stacked in pans to a depth of about 8 inches and dried overnight at about 150° C.

After drying the pans of pellets were charged into a vacuum furnace. The pressure in the furnace was maintained at 2.5 mm. of mercury by manipulating the heating schedule up to a maximum temperature of 1250° C. The temperature was maintained at 1250° C. until the furnace pressure dropped to 500 microns of mercury after which the furnace was cooled to 200° C. with argon and discharged. This procedure removed 85 to 90% of the oxygen in the charge as carbon monoxide and left the first-stage product in a "coky" condition suitable for re-milling in preparation of the second-stage furnace operation.

The product from the first-stage operation was ground in a ball mill for about 2 hours. The ground product was analyzed and found to contain 4.03% carbon and 5.79% oxygen. Ground pellets from another first-stage batch containing more than the stoichiometric porportion of carbon to oxygen were added to the ground product to produce a stoichiometrical mixture and the mixture was then carefully blended. The mixture so prepared was then pelleted using a small amount of water as a binder and the pellets dried as in the first-stage treatment.

The dried pellets were then charged into a vacuum furnace. The pressure in the furnace was maintained at 2.5 mm. of mercury by incrementally increasing the furnace temperature to a maximum temperature of 1400° C. When the pressure dropped off at this temperature to a pressure level of about 75 microns of mercury, the furnace was cooled with argon to about 200° C. and discharged.

The final product was in the form of highly compacted, uniformly porous, strongly cohesive, non-friable sintered pellets of chromium metal containing:

| | Percent |
|---|---|
| Chromium | 98.20 |
| Iron | 0.33 |
| Silicon | 0.20 |
| Carbon | 0.01 |
| Manganese | 0.01 |
| Sulphur | 0.10 |
| Oxygen | 0.49 |

The present application is a continuation-in-part of United States patent application, Serial No. 101,240, filed June 24, 1949, now abandoned.

What is claimed is:

1. A highly compacted, uniformly porous, strongly cohesive, fine grained, non-friable, coalesced metal aggregate containing in excess of 98 percent chromium and less than 2 percent of reduced non-volatile metals together with incidental impurities.

2. A highly compacted, uniformly porous, strongly cohesive, fine grained, non-friable, coalesced metal aggregate containing in excess of 98 percent chromium, at least one non-volatile metal selected from the group consisting of nickel and cobalt, the remainder being incidental impurities.

3. A highly compacted, uniformly porous, strongly cohesive, fine grained, non-friable, coalesced metal aggregate containing in excess of 98 percent chromium, at least one volatile metal selected from the group consisting of nickel and cobalt, the remainder being incidental impurities, said aggregate having an apparent density between 5 grams per cubic centimeter and about 5.5 grams per cubic centimeter.

4. A highly compacted, uniformly porous, strongly cohesive, fine grained, non-friable, coalesced metal aggregate consisting of chromium and incidental impurities.

5. A highly compacted, uniformly porous, strongly cohesive, fine grained, non-friable, coalesced metal aggregate consisting of chromium and incidental impurities, said aggregate having an apparent density between 5 grams per cubic centimeter and about 5.5 grams per cubic centimeter.

References Cited in the file of this patent

UNITED STATES PATENTS

| | | |
|---|---|---|
| 979,363 | Arsem | Dec. 20, 1910 |
| 1,423,847 | Gustafson | July 25, 1922 |
| 1,731,267 | Rich | Oct. 15, 1929 |
| 2,101,426 | Burgess | Dec. 7, 1937 |
| 2,124,020 | Wirth | July 19, 1938 |
| 2,133,291 | Gordon | Oct. 18, 1938 |
| 2,154,700 | Ruben | Apr. 18, 1939 |
| 2,205,386 | Balke et al. | June 25, 1940 |
| 2,242,759 | Schlecht et al. | May 20, 1941 |
| 2,339,137 | Berge | Jan. 11, 1944 |
| 2,349,825 | Kelleher | May 30, 1944 |
| 2,466,091 | Feild | Apr. 5, 1949 |
| 2,470,790 | Price | May 24, 1949 |
| 2,473,019 | Erasmus | June 14, 1949 |
| 2,473,020 | Erasmus | June 14, 1949 |
| 2,473,021 | Spendellow et al. | June 14, 1949 |
| 2,545,821 | Lindsley et al. | Mar. 20, 1951 |